W. WRIGHT.
ROAD WHEEL OF VEHICLES.
APPLICATION FILED OCT. 15, 1909.
1,042,742.
Patented Oct. 29, 1912.
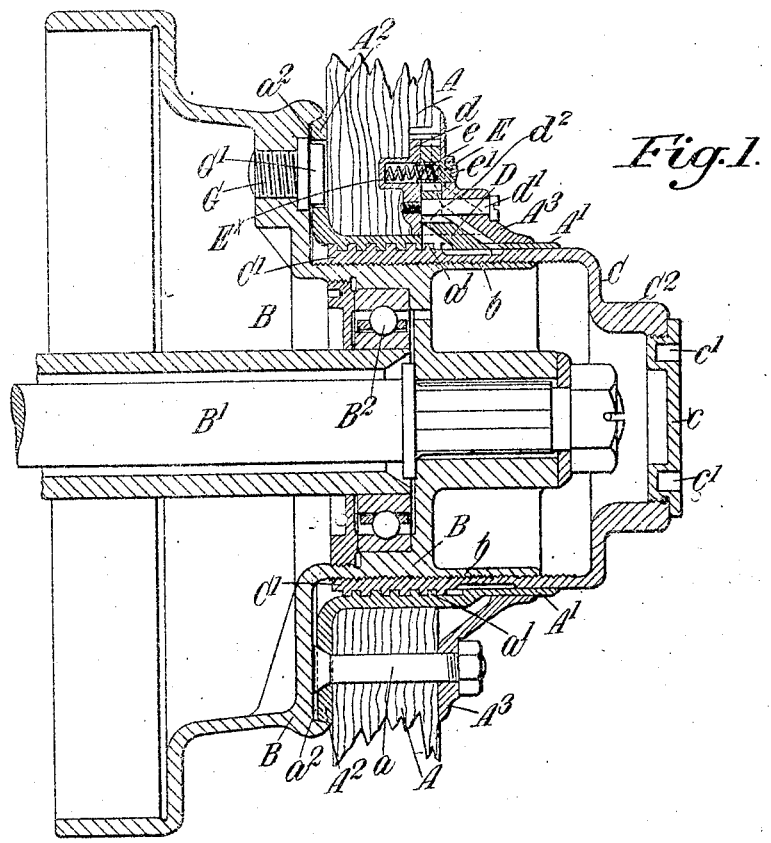
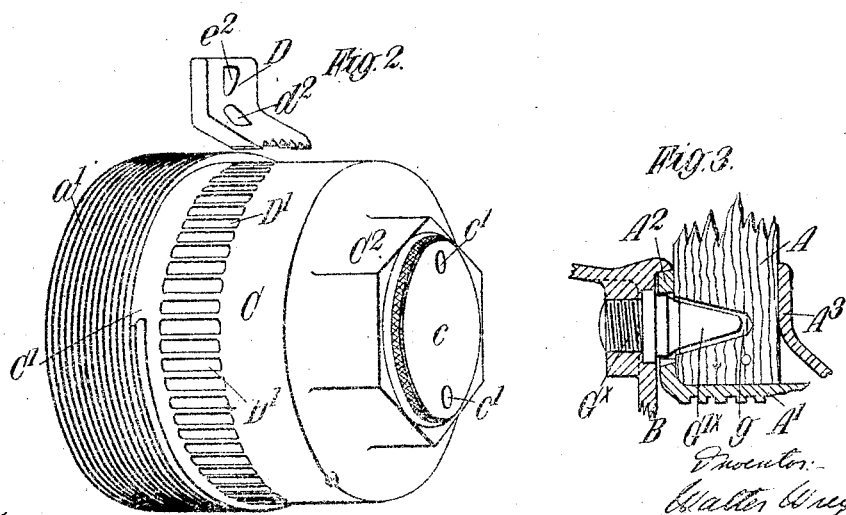

UNITED STATES PATENT OFFICE.

WALTER WRIGHT, OF COVENTRY, ENGLAND.

ROAD-WHEEL OF VEHICLES.

1,042,742.  Specification of Letters Patent.  Patented Oct. 29, 1912.

Application filed October 15, 1909. Serial No. 522,834.

*To all whom it may concern:*

Be it known that I, WALTER WRIGHT, a subject of the King of Great Britain, residing at Stonelaw, 2 Stoke Park, Coventry, in the county of Warwick, England, have invented certain new and useful Improvements in Road-Wheels of Vehicles, of which the following is a specification.

This invention relates to road wheels of vehicles comprising a main hub fitting around the axle and a wheel body, including an auxiliary hub fastened thereto, which is normally secured on the main hub but is adapted to be readily detached therefrom.

It has been proposed to provide a wheel for road vehicles with a differential nut or sleeve screwed internally to fit a threaded extension of the axle, and externally with a thread of somewhat finer pitch than that of the internal thread to fit a correspondingly threaded extension of the wheel hub. This arrangement is such that when the differential nut is screwed home it acts to hold the wheel on a keyed and tapered portion of the axle and when the said nut is unscrewed it exerts a powerful pull on the wheel to dislodge it slightly from its axle. Before the said nut can be operated it is necessary to remove the grease cap and before the wheel with its hub can be completely displaced from the axle by hand, the said nut has to be removed from the axle.

It is the chief object of the present invention to so adapt a differential nut or sleeve in relation to the wheel body and its main hub, that the rotation of the said nut displaces the wheel body without necessitating the removal of any of the parts of the main hub.

According to the present invention a sleeve is provided with external and internal screw threads which are adapted to engage with corresponding threads on the wheel body and main hub respectively, the said threads being so arranged relatively to each other that the rotation of the said sleeve in one direction causes the wheel body to move axially on the main hub so as to be displaced therefrom, while rotation in the reverse direction causes the wheel body to be drawn into position on the main hub. The said screw threaded sleeve may conveniently be in the form of an extension of the ordinary hub cap, and a pawl may be provided engaging with suitable teeth formed on the sleeve for locking the same in position.

In order that my said invention may be clearly understood and readily carried into effect I will describe the same more fully with reference to the accompanying drawings, in which:—

Figure 1 is a vertical sectional elevation of one constructional form of the invention. Fig. 2 is a perspective view of the hub cap, and Fig. 3 is a sectional view of a detail.

In these drawings, A is the wheel body which is provided with an auxiliary hub A' which has a flange A² to which the nave plate A³ is connected by means of bolts $a$ passing through the wheel body. The said auxiliary hub is screw-threaded interiorly with preferably square threads $a'$ of substantial pitch and the main hub B is threaded exteriorly with a thread $b$ of finer pitch than that in the auxiliary hub A' but of the same sense, preferably left-handed. The main hub is attached to the axle B' in any usual manner and is provided with ball bearings B².

The hub cap C is formed with an inwardly directed cylindrical extension or sleeve C' which normally occupies a position intermediate the auxiliary hub A' and main hub B and is suitably threaded exteriorly and interiorly to correspond with the threads $a'$ and $b$ formed on the auxiliary hub and main hub respectively. The outer part of the cap is preferably left plain the end being formed with a hexagonal head C² or otherwise fashioned so as to facilitate its rotation by a spanner or key. The end of the head C² is adapted to receive a screw-threaded grease cap $c$ having suitable holes $c'$ for the insertion of a key for rotating the same. The cap C is securely locked from rotation after the wheel body is fixed on the main hub, by means of a pawl D on the wheel body engaging with teeth D' formed on said cap. The said pawl is mounted between a plate $d$ and the nave plate A³ and is retained in position by means of a set screw $d'$ which passes through a slot $d²$ formed in the said pawl D. A spring controlled plunger E which normally closes a hole in the nave plate A³ to exclude dirt, is adapted to 10 be moved longitudinally against the action of its spring e by means of a key, the end of which enters a hole e' formed in the plunger E. When the said plunger is moved into the recess E×, the key can be rotated and a bar thereon engaging with a slot e² in the pawl D, the latter is moved out of or into engagement with the ratchet teeth D'.

The drive is transmitted by means of studs G fixed in the main hub, the heads G' of which engage in holes formed in the flange A². One, G× (Fig. 3) of these driving studs has a conical head G¹× which engages in a corresponding conical hole g formed in the wheel A, the said conical head also serving the purpose of preventing the wheel rotating when being drawn on or off the hub.

To provide for the wheel centering itself accurately when in position and to partially relieve the cap C of the weight of the wheel, the periphery of the flange A² of the auxiliary hub A' is of conical form and fits within an annular conical recess a² formed in the face of the main hub. This arrangement also allows a space between the end of the screwed sleeve C' and the bottom of the said recess to provide for the travel of the cap C when the wheel body is being removed.

In operation, when it is desired to detach the wheel from the main hub the aforesaid pawl D is first raised out of action in any suitable manner so as to leave the cap C free to be rotated. The wheel body which is prevented from revolving is then drawn off the threaded part of the said cap by screwing the latter inward on the main hub. In attaching the wheel body the reverse operation takes place, i. e. the wheel body is slipped over the cap up against the threaded part thereof and on the said cap being then screwed outward the wheel body is drawn on to the main hub and subsequently locked by causing the aforesaid pawl to engage the ratchet teeth on the cap.

The amount of axial movement required to be given to the cap C to completely detach the wheel body need only be a fraction of the necessary axial travel of the latter and is determined by the ratio of the pitch of the threads a' and b on the exterior and interior surface respectively of the sleeve C' of the cap C.

According to an alternative construction the inner and outer threads on the cap C hereinbefore described instead of being of the same sense may be of opposite sense or direction the effect of which would be to require the said cap to be manipulated in an opposite manner to that hereinbefore described in attaching and detaching the wheel body, i. e. the wheel body would be attached by screwing the cap inward instead of outward as before while outward rotation of the said cap would detach the wheel body.

What I claim and desire to secure by Letters Patent of the United States is:—

1. In a road wheel structure for vehicles, a wheel body, a main hub, and a sleeve having external and internal screw threads arranged to engage with corresponding screw threads on the wheel body and the main hub respectively, so that the rotation of said sleeve on said main hub causes the wheel body to move axially on the main hub.

2. In a road wheel structure for vehicles, a wheel body, a main hub, and a sleeve having external screw threads of considerable pitch arranged to engage with corresponding screw threads on the wheel body, and also having internal screw threads of smaller pitch arranged to engage with corresponding screw threads on the main hub.

3. In a road wheel structure for vehicles, a wheel body, a main hub, and a hub cap having external screw threads of considerable pitch arranged to engage with corresponding screw threads on the wheel body, and also having internal screw threads of smaller pitch arranged to engage with corresponding threads on the main hub.

4. In a road wheel structure for vehicles, a wheel body, a main hub, an auxiliary hub forming a part of the wheel body, a sleeve having external screw threads of considerable pitch arranged to engage with corresponding screw threads on the auxiliary hub, and also having internal screw threads of smaller pitch arranged to engage with corresponding screw threads on the main hub, a flange on the auxiliary hub, driving studs fixed in the main hub and engaging in holes formed in said flange, and a conical head to one of said driving studs engaging in a corresponding hole in the wheel body.

5. In a road wheel structure for vehicles, a wheel body, a main hub, an auxiliary hub forming a part of the wheel body, a sleeve having external screw threads of considerable pitch arranged to engage with corresponding screw threads on the auxiliary hub, and also having internal screw threads of smaller pitch arranged to engage with corresponding screw threads on the main hub, ratchet teeth on the periphery of the sleeve and a pawl movable on the wheel body and normally engaging with the ratchet teeth to prevent accidental rotation of said sleeve.

6. In a road wheel structure for vehicles, a wheel body, a main hub, an auxiliary hub forming a part of the wheel body, a sleeve having external screw threads of considerable pitch arranged to engage with corresponding screw threads on the auxiliary hub, and also having internal screw threads of smaller pitch arranged to engage with corresponding screw threads on the main hub, ratchet teeth on the periphery of the sleeve, a flange on said auxiliary hub, a nave plate arranged on the outer surface of the wheel body, means for tying the nave plate to the flange of the auxiliary hub, and a movable pawl adapted to engage with the ratchet teeth.

7. In a road wheel structure for vehicles, a wheel body, a main hub, an auxiliary hub forming a part of the wheel body, a sleeve having external screw threads of considerable pitch arranged to engage with corresponding screw threads on the auxiliary hub, and also having internal screw threads of smaller pitch arranged to engage with corresponding screw threads on the main hub, ratchet teeth on the periphery of the sleeve, a flange on the auxiliary hub, a nave plate arranged on the outer surface of the wheel body, means for tying said nave plate with the flange of the auxiliary hub, a plate mounted on the wheel, a pawl between said plate and the nave plate arranged to engage the ratchet teeth, and means for retaining said pawl in engagement with said ratchet teeth.

8. In a road wheel structure for vehicles, a wheel body, a main hub, an auxiliary hub forming a part of the wheel body, a sleeve having external screw threads of considerable pitch arranged to engage with corresponding screw threads on the auxiliary hub, and also having internal screw threads of smaller pitch arranged to engage with corresponding screw threads on the main hub, ratchet teeth on the periphery of the sleeve, a flange on the auxiliary hub, a nave plate arranged on the outer surface of the wheel body, means for tying the nave plate to the flange of the auxiliary hub, a plate mounted on the wheel body, a pawl between said plate and the nave plate arranged to engage the ratchet teeth, a set screw on which said pawl is mounted, and a spring controlled plunger normally engaging with a hole in said pawl and in said nave plate.

In testimony whereof I affix my signature in presence of two witnesses.

WALTER WRIGHT.

Witnesses:
 WILLIAM SMITH,
 FRANK TAYLOR.